US006967740B1

(12) United States Patent
Leng et al.

(10) Patent No.: US 6,967,740 B1
(45) Date of Patent: Nov. 22, 2005

(54) VIRTUAL MEDIA SIZE PRINTING SYSTEM

(75) Inventors: Johann Seet Chim Leng, Singapore (SG); Phang Soon Kian, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1198 days.

(21) Appl. No.: 09/088,547

(22) Filed: Jun. 1, 1998

(51) Int. Cl.⁷ .............................................. G06K 15/02
(52) U.S. Cl. ..................................... 358/1.18; 358/1.12
(58) Field of Search ............................ 358/1.11, 1.12, 358/1.16, 1.17, 1.18

(56) References Cited

U.S. PATENT DOCUMENTS

| | | | | | |
|---|---|---|---|---|---|
| 4,555,802 A | * | 11/1985 | Fedak et al. | ................... | 382/56 |
| 4,686,540 A | * | 8/1987 | Leslie et al. | ................... | 346/33 |
| 5,485,553 A | * | 1/1996 | Kovalick et al. | ............ | 358/1.6 |
| 5,551,785 A | * | 9/1996 | Mori et al. | .................... | 400/76 |
| 5,793,392 A | * | 8/1998 | Tschida | ....................... | 347/40 |
| 5,966,219 A | * | 10/1999 | Mori | .......................... | 358/442 |
| 6,018,687 A | * | 1/2000 | Tabor | ......................... | 700/125 |
| 6,134,016 A | * | 10/2000 | Watanabe et al. | ............ | 358/1.1 |

* cited by examiner

Primary Examiner—King Y. Poon

(57) ABSTRACT

A printing system that includes a printer for providing printouts of documents using printing media. Additionally, the printing system includes a computer that has a printer driver for the printer. The computer also has an application program that can receive information regarding a printing media size and generate printing information of the documents. A page of a document is formatted with this printing media size and when a printout of this document page is required, the application program generates the printing information for the document page. A further printing media size that is smaller than the formatting printing media size is also determined. The printing information for the document page is then segmented so that the segmented printing information provides for at least two segmented printouts at the printer. Each segmented printout uses a sheet of printing medium and at least one of the segmented printouts is of the smaller printing media size. When these segmented printouts are assembled, they form the printout of the document page according to the formatting printing media size.

16 Claims, 4 Drawing Sheets

VIRTUAL MEDIA SIZE PRINTING SYSTEM

FIELD OF INVENTION

The invention relates generally to computing systems provided with printing functionality. In particular, it relates to a printing system for providing a printout of a page of document formatted with a media size that the printer does not support.

BACKGROUND OF THE INVENTION

A printer is an essential computer peripheral that provides printing services to a computer user—whose computer is connected with the printer by providing hard copies, or printouts, of documents. Such documents are usually created or edited using application programs installed on the computer like word processors, spreadsheet programs, or drawing tools. For the printer to be able to provide the printing services, the computer also needs to be installed with a printer driver associated with the printer. A printer can also be connected to a network and therefore provide printing services to computer users whose computers are also connected to the network.

For practical marketing and business reasons, the printer market is segmented and printer manufacturers typically design their printers to meet the needs of computer users in each printer market segment. Examples of printers sold in some market segments include home printers, office printers, network printers, wide format printers, large format printers, inkjet printers and laser printers.

Most printers can only provide printouts of documents using print media, such as paper or transparencies, of commonly available, or standard, sizes. Due to other physical constraints, such printers would also only be able to handle print media not exceeding a maximum size. Hence, each of these printers is known to only work with, or support, print media in a range of standard sizes peculiar to that printer. For example, an above exemplified wide format printer can generally make a printout of a page of document using print media having a standard size not smaller than the Index Card size and not larger than the Super B size. In a typical create-and-print sequence, a printer driver for a printer will first report the standard media sizes that the printer supports to an application program in a computer connected with the printer. The application program will in turn make these media sizes available to the computer user, who will subsequently select a suitable media size for formatting a document. In formatting the document, the computer user, among other things, defines the media size and a corresponding imaging area on which a page of the document is to be created. When a printout of the document is required, its printing information is sent to the printer driver. The printer driver then processes the document's printing information—including converting it from its initial form of drawings commands into raster information, and then into printer language—before sending it to the printer for producing the printout.

The selection of media sizes which the computer user can choose in the application program and format documents with, therefore, is largely dependent on the media sizes that the printer supports. For example, if the printer supports print media up to a maximum size, then documents that are created using the application program cannot be formatted with a media size larger than this maximum media size. In the case where documents preformatted with a media size larger than this maximum media size are edited using the application program, the printouts of the documents may be made only with some form of shrinking or truncation to their printing information.

In an effort to add value to printers sold in the various printer market segments, printer manufacturers are turning to innovative technologies to provide new and useful printer features and capabilities. For example, the HP DeskJet 1100C Printer from the Hewlett-Packard Company provides a ZoomSmart scaling technology that enables a computer user to produce enlarged or reduced printouts of documents without the need to reformat the documents. Therefore, in the above situation where a document was preformatted using a larger media size, the printing information for the document can be reduced using the ZoomSmart scaling technology. A printout of the document can then be made on a print media of a user-determined media size that the printer supports.

While printers with such a new and useful technology are widely in use and meet most of today's sophisticated computer users' high expectations of printing services, they suffer from limitations. The ZoomSmart scaling technology provides computer users the option to divorce the media size used to format documents from the size of the print media with which the printout of the document is made. However, such a technology does not cater to some specialist computer users' need for accuracy and fidelity in a printout of a document formatted using a large media size. One such group of specialist computer users may be computer aided design (CAD) application programs users.

Drawings created using CAD application programs are typically formatted with large media sizes, for example D-size. In formatting drawings with such large media sizes, the CAD user is presented with a corresponding large imaging area to work in. If an above-mentioned wide format printer is used to provide printouts of these large CAD drawings, where the printer is unable to support print media of such large media sizes but is value added with the ZoomSmart scaling technology, several things may take place. Firstly, the printing information of the CAD drawings may be reduced. Then the printouts may be made on a smaller standard media size that the printer supports.

An important consideration that most CAD users have when they use a printer to provide printouts of CAD drawings is whether a square-inch of drawing detail in the large CAD drawings could be printed accurately as a square-inch of drawing detail on the printouts. If such printouts are reduced, they are considered inaccurate and undesirable.

Accordingly, it an object of the present invention to provide a printing system for providing a printout of a page of document formatted with a media size that the printer does not support. Substantial accuracy and fidelity can therefore be advantageously provided in the printout of a page of document formatted with a large media size.

SUMMARY OF THE INVENTION

The invention provides a printing system that includes a printer for providing printouts of documents using print media. Additionally, the printing system includes a computer that has a printer driver associated with the printer. The computer also has an application program that can receive information regarding a media size and generate printing information of the documents. A page of a document is formatted with this media size and when a printout of the document page is required, the application program generates the printing information for the document page. A further media size that is smaller than the formatting media size is also determined. The printing information for the document page is then segmented so that the segmented printing information provides for at least two segmented printouts at the printer. Each segmented printout uses a sheet of printing medium and at least one of the segmented printouts is of the smaller media size. When these segmented printouts are assembled in juxtaposition, they form the printout of the document page according to the media size.

Preferably, the formatting media size is larger than the maximum media size that the printer supports. Additionally, the printer supports the smaller media size and all the segmented printouts are according to this smaller media size. Furthermore, the print media orientation corresponding to the smaller media size is determined to achieve an optimized layout for the assembly of segmented printouts.

The invention advantageously affords computer users, when requiring printouts of standard large documents, with a square-inch of document detail in the documents accurately printed as a square-inch of document detail on the printouts. Substantial accuracy and fidelity of such documents is thus maintained on the printouts.

The invention provides a printing system for providing a printout of a page of document formatted with a media size that the printer does not support, that is, a virtual media size, thereby maintaining substantial accuracy and fidelity of the document in the printout.

BRIEF DESCRIPTION OF THE DRAWINGS

The invention will be better understood with reference to the drawings, in which.

DETAILED DESCRIPTION OF THE PREFERRED EMBODIMENT

Figure 1:
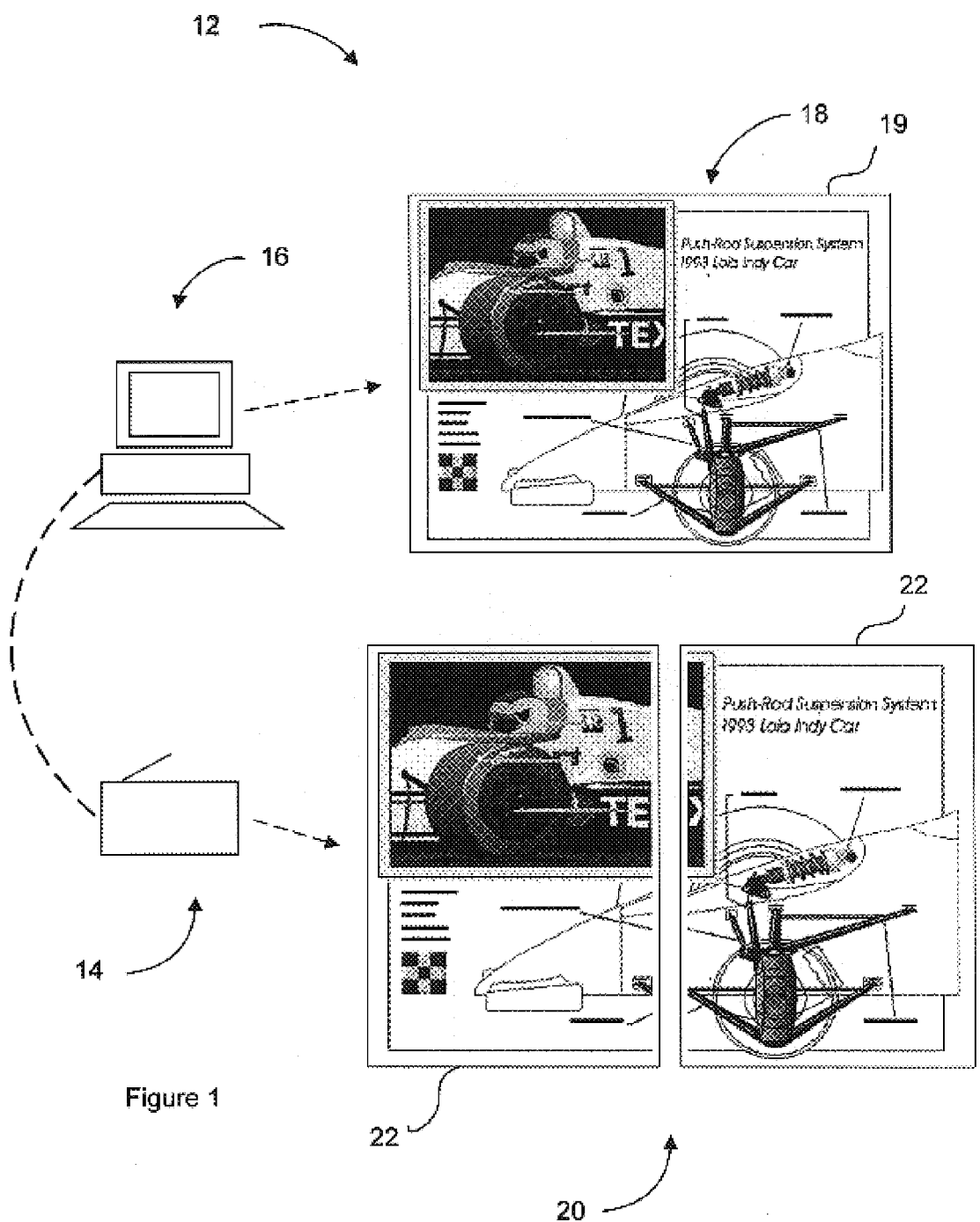
FIG. 1 illustrates the effect of a printing system according to a preferred embodiment of the invention on a document that is formatted with a virtual media size, where segmented printouts that can be assembled to form a printout with the virtual media size are produced.

Reference is first made to FIG. 1 to briefly describe a printing system 12, which is according to a preferred embodiment of the invention, having a printer 14 and a computer 16. The printer 14 and the computer 16 are connected either directly or through a network (not shown). An application program 32 (see FIG. 4 later) and a printer driver 36 (see FIG. 4 later) associated with the printer 14 are installed on the computer 16. With the application program 32, a computer user can create or edit, or generally prepare, a document 18 and generate the printing information for the document 18. For the purpose of providing a better understanding of the invention, the description hereinafter will be based upon the document 18 that is a single-page document. While creating or editing the document 18, the computer user formats or reformats respectively the document 18 with a media size which the printer driver 36 reports to the application program 32. The printing system 12 advantageously allows the computer user to format the document 18 with a media size larger than the maximum media size that the printer 14 supports, or a virtual media size 19. The printing information for the document 18 is then suitably segmented into segmented printing information for making segmented printouts 20 of the document 18 at the printer 14 using print media 22. The segmented printouts 20 can then be assembled in juxtaposition to form a printout of the document 18 with the virtual media size 19 with which it was formatted without any substantial loss in details and fidelity. Each of the print media 22 is of a standard media size that the printer 14 supports, and is smaller than the virtual media size 19. This standard media size is also optimally chosen so that a minimal number of segmented printouts 20 is required to form the assembly.

The functional aspect of the preferred embodiment of the invention will now be described in greater detail with reference to FIGS. 2 and 3. As mentioned in the foregoing, the application program 32 allows the computer user to format or reformat the document 18 with a media size. In creating the document 18, the computer user formats it with a media size for a first time. Whereas in editing the document 18, the computer user may format it with a media size that is different from the media size with which it was first formatted. In any event, whenever the computer user is described to create or edit the document 18 hereinafter, the computer user shall be known to format or reformat the document 18 with a virtual media size 19.

Figure 2:
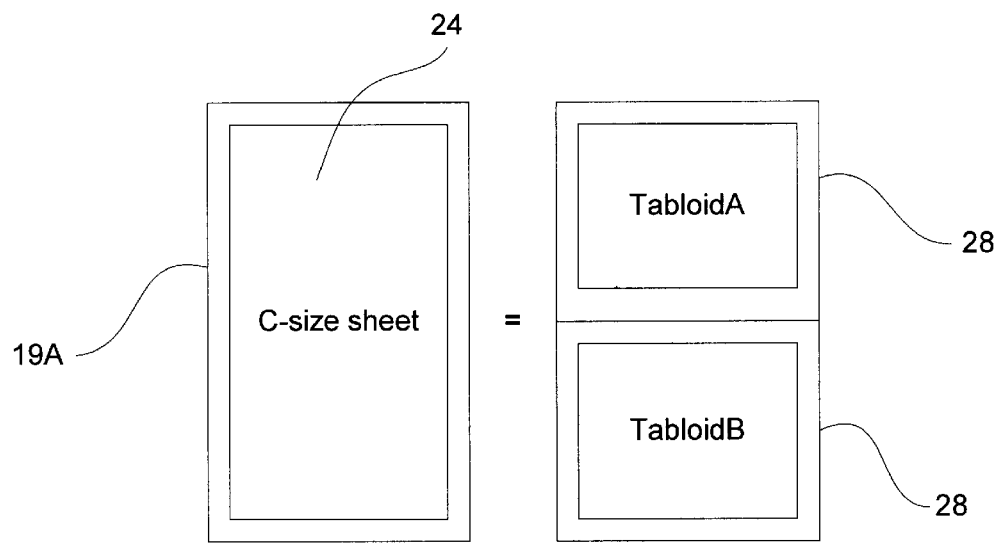
FIG. 2 illustrates the effect of the printing system in FIG. 1 on a document formatted with a virtual C-size, distinctly showing the imaging area of the virtual C-size document and the printable area on each of the two segmented printouts using Tabloid size media.
Figure 3:
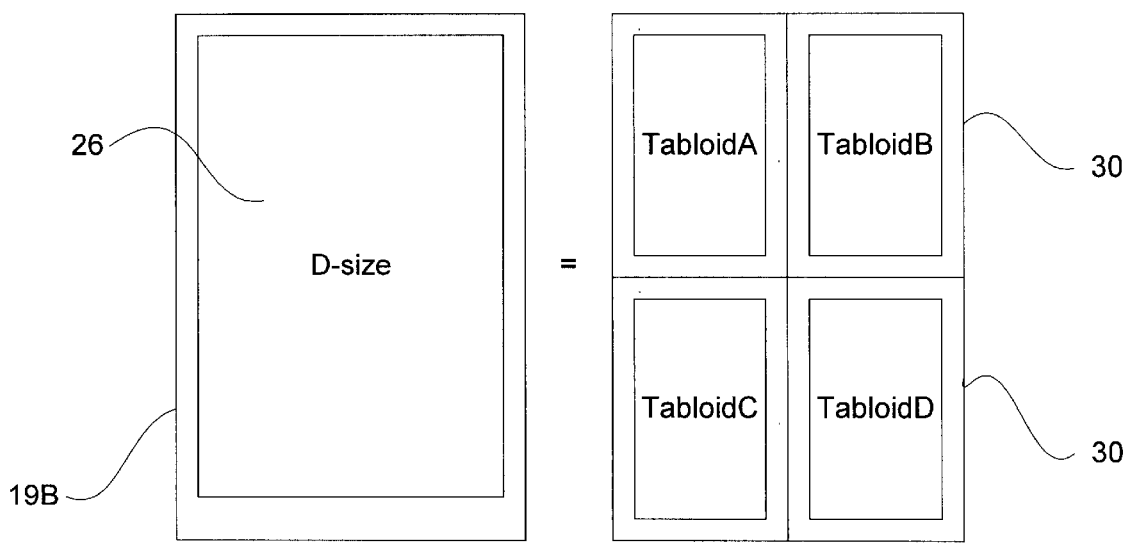
FIG. 3 illustrates the effect of the printing system in FIG. 1 on a document formatted with a virtual D-size, distinctly showing the imaging area of the virtual D-size document and the printable area on each of the four segmented printouts using Tabloid size media.

Such a virtual media size 19 can, for example, be a C-size 19A as shown in FIG. 2. It can also, for example, be a D-size 19B as shown in FIG. 3. The application program 32 provides these exemplified virtual media sizes 19 to the computer user, in addition to the media sizes that the printer 14 typically supports, via, for example, the user interface for its page setup functionality (not shown). After the computer user selects one of the virtual media sizes 19 to format the document 18, a corresponding imaging area is defined for the computer user. The computer user uses this imaging area to create the document 18, or place the document 18 when editing the document 18. A C-size imaging area 24 corresponds to the C-size 19A as shown in FIG. 2, and a D-size imaging area 26 corresponds to the D-size 19B as shown in FIG. 3.

After preparing the document 18, the computer user may require a printout of the document 18. The computer user will first need to initiate a print process to obtain this printout. Such initiation of the print process includes the actuation of, for example, a print icon or "button", or the selection of a print option from a menu. The print process then continues with the application program 32 making printing calls to an operating system OS 34 (see FIG. 4 later), for example and not as a limitation, a Windows OS 34, in the computer 16. The application program 32 subsequently sends the printing information of the document 18 to the Windows OS 34—also known as sending a print job to the Windows OS 34 to those skilled in the art.

The printer driver 36 then interacts with the Windows OS 34 regarding the print job, which will be described in detail later, and receives printing information that the printer 14 will use to produce the segmented printouts 20. For example, the printer 14 will produce a pair of segmented printouts 28, each using a landscape Tabloid size printing medium, if the document 18 is formatted with the virtual portrait C-size 19A. Alternatively, the printer 14 will produce four segmented printouts 30, each using a portrait Tabloid size printing medium, if the document 18 is formatted with the virtual portrait D-size 19B.

Each of the segmented printouts 20 consists of a printable area and a set of margins; namely the top, bottom, left and right margins. The printable areas of all the segmented printouts 28, when placed side by side, or juxtaposed, equals in size with the imaging area of the document 18 formatted with the virtual media size 19. Whereas only some of the margins of each segmented printout 20 contribute to the margins of the document 18. For example, the C-size imaging area 24 of the document in FIG. 2 has the same size as the printable areas of the pair of landscape Tabloid segmented printouts of 28 when they are juxtaposed. However, only the top, left and right margins of the upper landscape Tabloid segmented printout 28, and the bottom, left and right margins of the lower landscape Tabloid segmented printout 28 form the margins in the document 18. The bottom margin of the upper landscape Tabloid segmented printout 28 and the top margin of the lower landscape Tabloid segmented printout 28 are known as "stitching" margins. These stitching margins are used for assembling the landscape Tabloid segmented printouts 28 so that the printable areas can be juxtaposed. Adhesives, for example, can be used to adhere the bottom margin of the upper landscape Tabloid segmented printout 28 to the back of the lower landscape Tabloid segmented printout 28, with its top margin removed, to achieve this effect. Alternatively, adhesives can be used to adhere the top margin of the lower landscape Tabloid segmented printout 28 to the back of the upper landscape Tabloid segmented printout 28 with its bottom margin removed.

Figure 4:
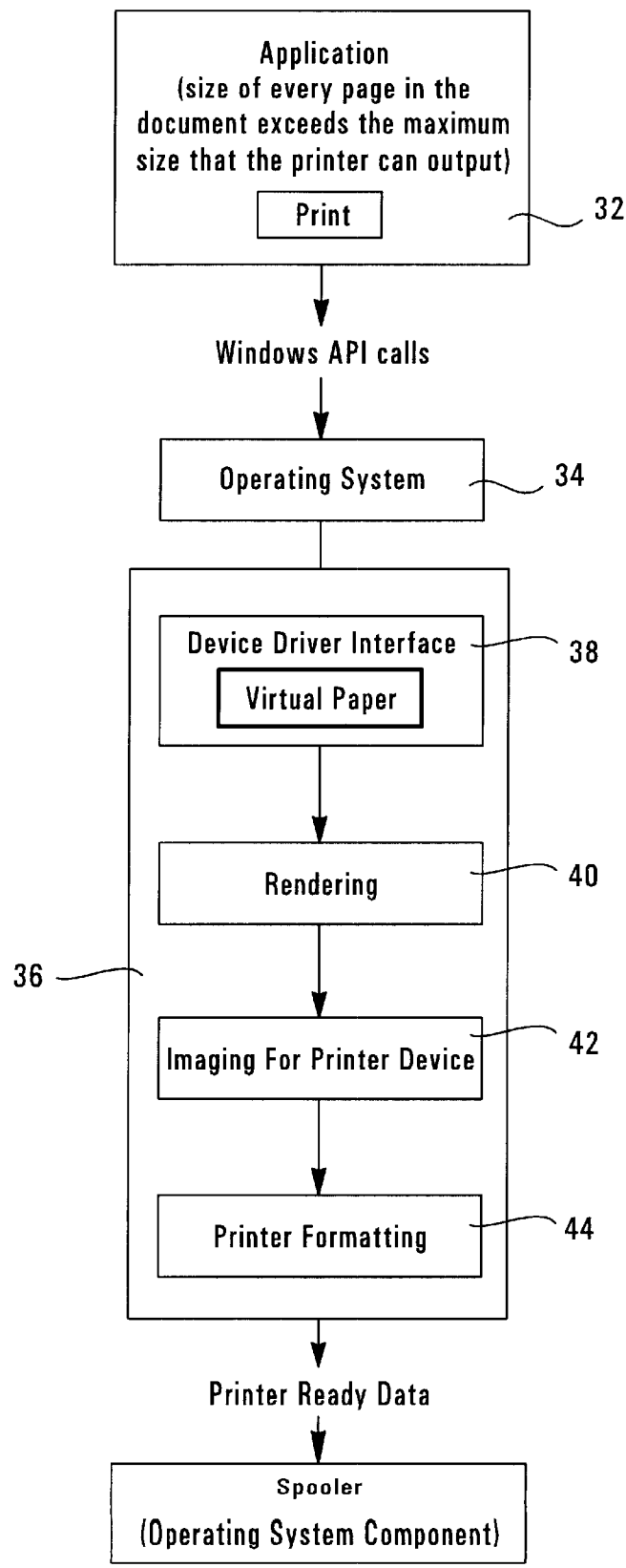
FIG. 4 illustrates a flow diagram detailing the steps of operation with which modules in the printing system in FIG. 1 interactively perform to provide the virtual media sizes for formatting documents and the segmented printouts that can be assembled to form a printout with the virtual media size.

The operational aspect of the preferred embodiment of the invention will now be described with reference to FIG. 4. For the application program 32 to be able to provide a selection of media sizes that the printer 14 typically supports and the virtual media sizes 19 to the computer user for formatting or reformatting purposes, the printer driver 36 first needs to make information relating to these media sizes available to the application program 32. Within the Windows OS 34 environment, for example, this step typically sets off when the application program 32 is launched and it initiates a query to the Windows OS 34 for this information. The Windows OS 34 in turn queries the printer driver 36, who reciprocates by reporting this information to the Windows OS 34. The Windows OS 34 then makes this information available to the application program 32. The rationale for taking this approach is to enable the printer driver 36 as a transparent common resource so that all the application programs can use it to access the printing services of the printer 14.

Before the printer driver 36 makes the information relating to the virtual media sizes 19 available to the application program 32, it will determine the maximum size of the imaging area and the margins of each of the virtual media sizes 19. The printer driver 36 determines these maximum sizes by taking into account the maximum achievable printable areas and layout of the juxtaposed prospective segmented printouts 20 corresponding to each virtual media size 19. The layout of these juxtaposed prospective segmented printouts 20 are predetermined for purposes of achieving an optimal layout requiring the minimal number of segmented printouts 20. Similarly, the printer driver 36 determines the margins of the virtual media sizes 19 by taking into account the margins, including the stitching margins, of the juxtaposed prospective segmented printouts 20.

Additionally, the printer driver 36 will determine the possible ways with which the document 18, when formatted with each virtual media size 19, may be oriented, by taking into account the achievable orientations of the prospective segmented printouts 20. For example, the portrait C-size print media 19A in FIG. 2 is associated with the pair of juxtaposed landscape Tabloid size segmented printouts 28. Or alternatively, a landscape C-size print media 19A (not shown in FIG. 2) is associated with a pair of juxtaposed portrait Tabloid size segmented printouts 28.

Such information containing the size of the printable area, the margins, and the orientation of each prospective segmented printout 20 relating to each virtual media size 19 is stored in the computer 16.

When the computer user is ready to make printouts of the document 18, after formatting and preparing it using the application program 32, the computer user will initiate the print process. The print process includes having the application program 32 perform the step of sending out a print job for the document 18 by making printing calls, which is commonly known to those skilled in the art. Again, the application program 32 sends the print job to the Windows OS 34 because the printer driver 36 is transparent to the application program 32.

Since the printer driver 36 is a resource managed by the Windows OS 34, the Windows OS 34 will enable the printer driver 36, via a device driver interface 38, to receive the print job for the document 18 after receiving the print job from the application program 32. Besides the print job, the Windows OS 34 also receives information from the application program 32 regarding the document 18 such as the media size with which the document 18 is formatted, the margins, and the orientation of the document 18. The Windows OS 34 relays this information to the device driver interface 38. The device driver interface 38 subsequently performs the step of using this information to determine how it will request for the printing information, or drawing commands as known to those skilled in the art, relating to the print job.

Once the device driver interface 38 detects that the document 18 is formatted with a virtual media size 19, it will trigger a sequence of further steps, which will be described in greater detail with reference to FIG. 5, to "break up" the print job into segmented printing information for producing the segmented printouts 20. Each set of segmented printing information pertains to one segmented printout 20, and hence will subsequently be processed by the remaining modules in the printer driver 36 as a separate and independent set of printing information. The remaining modules in the printer driver 36 can be, for example, an image rendering module 40, an image processing module 42, and a printer language formatting module 44, all of which are commonly known to those skilled in the art. After these remaining modules process each set of segmented printing information, it is sent to the printer 14 for producing the segmented printout 20.

Figure 5:
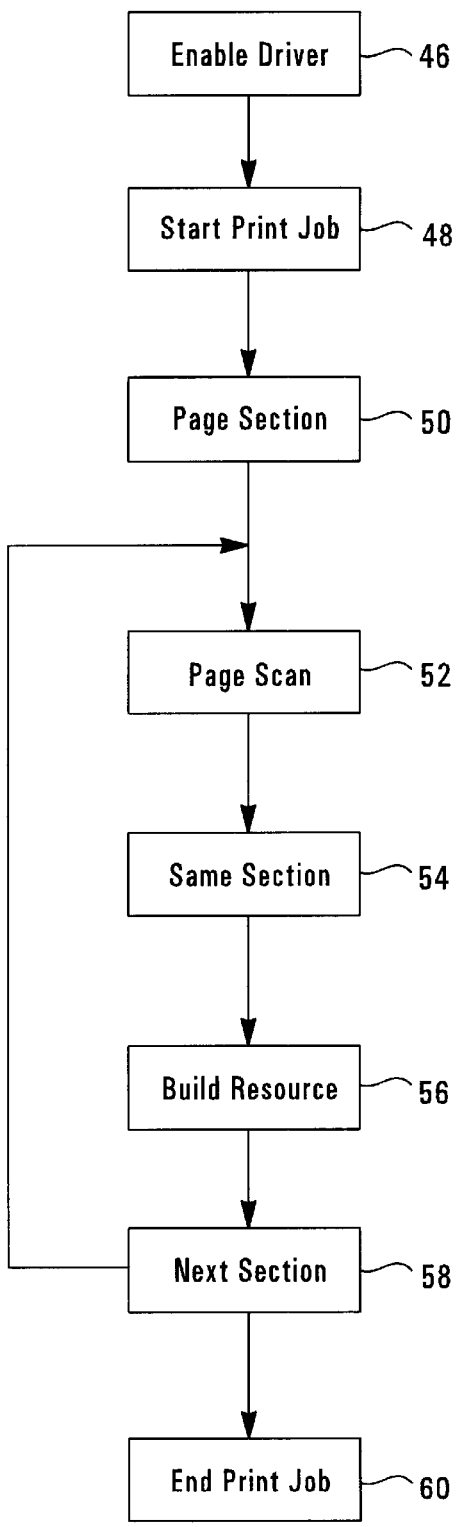
FIG. 5 illustrates a flow diagram detailing the steps of operation with which a printer driver module shown in FIG. 4 performs to process the printing information of the document formatted with the virtual media size.

Reference is now made to FIG. 5 to describe the operational steps with which the printer driver 36 and the Windows OS 34 perform to break up the print job. The entry point for this sequence of operational steps is when the printer driver 36 is enabled, via the device driver interface 38, by the Windows OS 34 to receive the print job for the document 18. In this Enable Driver step 46, the device driver interface 38 reads the information regarding the document 18 from the application program 32. In the Windows OS 34 environment, the application program 32 stores this information specifically in the Printer Device Mode Store (not shown), and the device driver interface 38 subsequently retrieves this information. Once the device drive interface 38 detects that the document 18 is formatted with the virtual media size 19, it will retrieve the information pertaining to the size of the printable area, the margins, and the orientation of each segmented printout 20 relating to the virtual media size 19 from the computer 14.

The Windows OS 34 then performs a Start Print Job step 48 where it informs the device driver interface 38 that it is going to send the print job for the document 18 to the printer driver 36. The device driver interface 38 then reciprocates by performing a Page Section step 50 where it informs the Windows OS 34 that it is ready to receive the print job. However, the device driver interface 38 will only request for drawing commands according to the printable area size, the margins, and the orientation of a first segmented printout 20. This process of requesting for the drawing commands of a part of a print job pertaining to a region of a page of a document is commonly known to those skilled in the art.

The Windows OS 34 then sends the drawing commands for the first segmented printout 20 to the device driver interface 38 in a Page Scan step 52. These drawing commands are used by the printer driver 36 for collecting information on color requirements for the part of the document 18 to be printed on the first segmented printout 20. The image processing module 42 will later use this information for image processing. After this information is collected, the printer driver 36 will request for the same drawing commands again in performing a Same Section step 54.

The Windows OS 34 subsequently sends a duplicate set of drawing commands for the first segmented printout 20 to the device driver interface 38 in a Build Resource step 56. The printer driver 36 then builds a set of resources with these drawing commands, which will later be used by the image rendering module 40 to convert, or render, the drawing commands into a bitmap, of a raster format known to those skilled in the art.

While the image rendering module 40 renders the drawings commands for the first segmented printout 20, the device driver interface 38 at the same time requests for drawing commands according to the printable area size, the margins, and the orientation of a second segmented printout 20 in a Next Section step 58. At this point, the sequence of operational steps loops back to the Page Scan step 52 until the drawing commands for all the segmented printouts 20 have been processed. The sequence of operational steps then ends with an End Print Job step 60 where the Windows OS 34 informs the printer driver 36 that the print job for document 18 had been completely sent out.

In the event that the document 18 is a multi-page document, the printer driver 36 will reiterate the sequence of operational steps starting with the Start Print Job step 48 for each page of the multi-page document 18.

The preferred embodiment may be modified in many ways. For example, the printer driver may receive the print job from the Windows OS in its entirety and perform its own segmentation of the print job according to the printable area size, the margins, and the orientation of each segmented printout. In another example, the printer driver may receive the print job directly from the application program if the preferred embodiment is implemented in an OS environment other than a Windows OS. In a further example, the computer user may be provided with the option to customize a media size with which to format a document. When the printer driver receives information regarding this customized media size, the printer driver may optimally determine, using well-known techniques, the layout, the quantity, the media sizes, and the individual orientation of prospective segmented printouts. Alternatively, the computer user may be provided with an additional option to input such information.

The above operational steps performed by the printing system according to the invention have been described in the context of the printer driver working in conjunction with the OS and the application program in the computer. Although this is generally the case, other software programs, when executed on the computer, are also capable of causing the computer to perform such operational steps according to the invention. These software programs, including the printer driver, may be stored in the computer on a storage device such as a hard disk. They may also be stored in other peripheral storage devices such as floppy disks, CD-ROMs, magnetic tapes and the like. They may even be stored as installation programs in any of the above storage devices and subsequently installed on the computer for execution.

We claim:

1. A method for enabling a printer to provide printouts of documents in a computer using sheet printing media, the computer having a printer driver for the printer and at least one application program capable of generating printing information of the documents, comprising the steps of:

providing the application program with information regarding a first media size for formatting a page of a document;

determining a second media size, wherein the second media size is smaller than the first media size;

generating the printing information for the page of the document including determining orientation of the second media; and segmenting the printing information for the page of the document into segmented printing information for enabling the printer to provide at least two segmented printouts, wherein at least one of the at least two segmented printouts is according to the second media size and a juxtaposed assembly of the segmented printouts forms a printout of the page of the document according to the first media size.

2. The method as in claim 1, further comprising the steps of:

transferring the printing information for the page of the document from the application program to the printer driver; and printing on sheet printing media using the segmented printing information for producing the segmented printouts at the printer, each segmented printout being made on a sheet of printing medium.

3. The method as in claim 2, wherein the step of providing the application program with information regarding the first media size for formatting the page of the document further includes providing the application with information regarding the first media size which is larger than the maximum media size that the printer supports.

4. The method as in claim 3, wherein the step of providing the application program with the information regarding the first media size further includes the printer driver providing the application program with information regarding the imaging area and margins associated with the first media size.

5. The method as in claim 4, wherein the step of determining the second media size further includes determining the second media size which is a standard media size that the printer supports.

6. The method as in claim 5, wherein the step of determining the second media size further includes
determining the maximum printable area and the margins including stitching margins associated with the second media size.

7. The method as in claim 6, wherein the step of segmenting the printing information of the page of the document into segmented printing information for enabling the printer to provide the at least two segmented printouts further includes segmenting the printing information of the page of the document into segmented printing information for enabling the printer to provide the at least two segmented printouts according to the second media size.

8. The method as in claim 7, wherein the step of segmenting the printing information of the page of the document into segmented printing information for enabling the printer to provide the at least two segmented printouts according to the second media size further includes segmenting the printing information of the page of the document into segmented printing information for enabling the printer to provide the at least two segmented printouts, wherein the imaging area associated with the first media size is not larger than the sum of the maximum printable areas of the juxtaposed assembly of the segmented printouts.

9. A program storage device readable by a computer, tangibly embodying a program of instructions executable by the computer to perform method steps for enabling a printer to provide printouts of documents in a computer using sheet printing media, the computer having a printer driver for the printer and at least one application program capable of generating printing information of the documents, said method steps comprising:
providing the application program with information regarding a first media size for formatting a page of a document;
determining a second media size, wherein the second media size is smaller than the first media size;
generating the printing information for the page of the document including determining orientation of the second media; and
segmenting the printing information for the page of the document into segmented printing information for enabling the printer to provide at least two segmented printouts, wherein at least one of the at least two segmented printouts is according to the second media size and a juxtaposed assembly of the segmented printouts forms a printout of the page of the document according to the first media size.

10. The device as in claim 9, further comprising:
transferring the printing information for the page of the document from the application program to the printer driver; and
printing on sheet printing media using the segmented printing information for producing the segmented printouts at the printer, each segmented printout being made on a sheet of printing medium.

11. The device as in claim 10, wherein the step of providing the application program with information regarding the first media size for formatting the page of the document further includes providing the application with information regarding the first media size which is larger than the maximum media size that the printer supports.

12. The device as in claim 11, wherein the step of providing the application program with the information regarding the first media size further includes the printer driver providing the application program with information regarding the imaging area and margins associated with the first media size.

13. The device as in claim 12, wherein the step of determining the second media size further includes determining the second media size which is a standard media size that the printer supports.

14. The device as in claim 13, wherein the step of determining the second media size further includes
determining the maximum printable area and the margins including stitching margins associated with the second media size.

15. The device as in claim 14, wherein the step of segmenting the printing information of the page of the document into segmented printing information for enabling the printer to provide the at least two segmented printouts further includes segmenting the printing information of the page of the document into segmented printing information for enabling the printer to provide the at least two segmented printouts according to the second media size.

16. The device as in claim 15, wherein the step of segmenting the printing information of the page of the document into segmented printing information for enabling the printer to provide the at least two segmented printouts according to the second media size further includes segmenting the printing information of the page of the document into segmented printing information for enabling the printer to provide the at least two segmented printouts, wherein the imaging area associated with the first media size is not larger than the sum of the maximum printable areas of the juxtaposed assembly of the segmented printouts.

* * * * *